April 25, 1967 M. STEIGMAN 3,315,313

THERMOFORMING MOLD

Filed Aug. 24, 1965

INVENTOR
MURRAY STEIGMAN
BY
ATTORNEY

[Col. 1]

3,315,313
THERMOFORMING MOLD
Murray Steigman, Millwood, N.Y., assignor to Union Carbide Corporation, a corporation of New York
Filed Aug. 24, 1965, Ser. No. 482,188
8 Claims. (Cl. 18—19)

This invention relates to a thermoforming mold particularly a capped-plug thermoforming mold for forming articles from thermoplastic sheet.

A conventional method for producing hollow plastic articles from thermoplastic sheet is to heat the sheet to a suitable deformation temperature, position it between a mold having a cavity and a mating plug or plunger of generally smaller dimensions than the cavity and move the plunger against the sheet and into the cavity to draw or stretch deform a portion of the sheet into the mold to at least partially form the hollow plastic article. Commonly, a fluid pressure differential is then exerted against the thus drawn sheet to expand it wholly against the walls of the cavity to completely form the article.

Generally, the type of equipment employed for such process includes a mold and plunger of material such as metal including stainless steel and aluminum or other rigid materials such as a metal mold and a plunger of felt material and the like. However, it has proved quite difficult to produce a plastic article, by such thermoforming apparatus, having a uniform or controlled wall thickness due to the tendency of the plastic sheet to slip excessively or unequally around the plunger while the sheet is being stretch-deformed by such plunger as it advances into the mold cavity. Commonly, for example, that part of the sheet in contact with the leading head portion thereof tends to adhere thereto, i.e., stretches and thins very little as the plunger advances into the mold cavity while the remaining part of the sheet which is deformed stretches excessively and becomes considerably thinned to form a drawn article of disproportionate wall thickness distribution.

Accordingly, it is an object of the present invention to provide an apparatus which can thermoform hollow plastic articles at a desired or readily controlled wall thickness.

It is another object of the invention to provide an apparatus adapted to readily and consistently thermoform hollow plastic articles of uniform wall thickness distribution.

These and other objects are provided in the present invention which serves as an improvement in an apparatus for thermoforming hollow plastic articles, said apparatus having a mold with a cavity therein, a plunger mounted in registration with said cavity, which plunger has a leading portion of smaller dimensions than said cavity and terminates in a plunger head, said plunger being adapted to contact a heated plastic sheet securely positioned between said plunger and the mold cavity and draw said sheet into said cavity for formation of said hollow plastic article, the improvement comprising a cap affixed to said head and covering a portion thereof so that the remainder of said head is exposed, said cap having a surface of lesser coefficient of friction than the surface of said head and serving to reduce the overall coefficient of friction of said leading portion.

The invention will become more apparent from the following detailed specification and the drawings, in which:

FIGURE 3 is an elevation view partly in section of

[Col. 2]

a thermoformed plastic article having an unequal wall thickness distribution.

Figure 4:
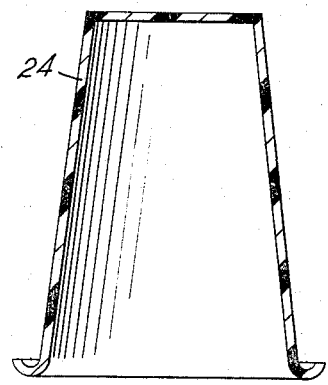

FIGURE 4 is an elevation view partly in section of a thermoformed plastic article having a generally uniform wall thickness distribution as formed by an apparatus embodying the present invention.

Figure 1:
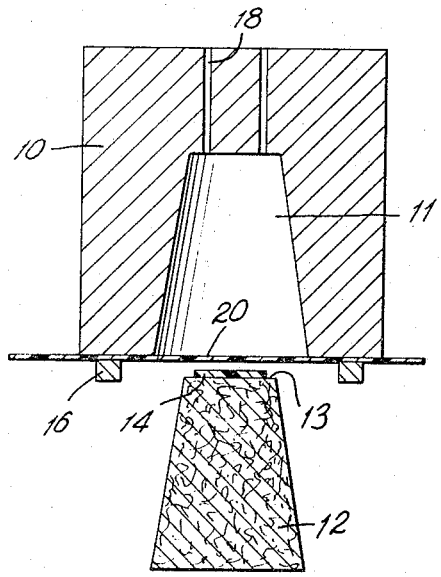
FIGURE 1 is an elevation view partly in section of an apparatus embodying the present invention showing the plunger and mold thereof in spaced relationship.
Figure 2:
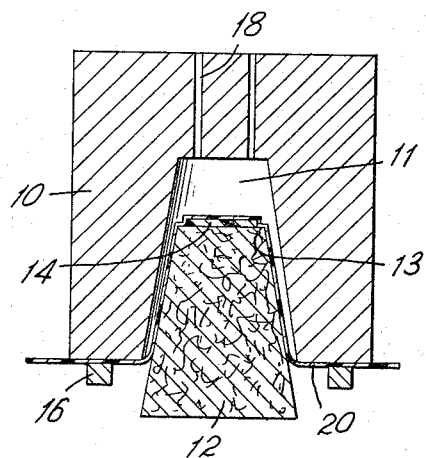
FIGURE 2 is an elevation view partly in section of the apparatus of FIGURE 1, the plunger having entered the mold cavity.

Referring now to the drawings, thermoplastic sheet 20 is securely clamped over the mold cavity 11 by ring 16 as shown for example, in FIGURE 1. Thereafter plunger 12, having a cap 14, mounted upon the plunger head 12, is advanced into contact with the thermoplastic sheet 20, already heated to a suitable deformation temperature (by means not shown), and thence into the cavity 11 of the mold 10 to draw the sheet therein as shown in FIGURES 1 and 2. Air trapped in the cavity 11 by the sheet 20 and plunger 12 entering therein is suitably vented through ports 18 as indicated in FIGURE 2. A means (not shown) to establish a fluid pressure differential on opposite sides of the drawn sheet is then applied to draw the sheet wholly into the cavity. Such means can be, for example, a vacuum pump connected with ports 18 on the outside of the mold 10, a positive pressure pump adapted to direct a fluid, conveniently air, against the plunger side of the drawn sheet or a combination thereof.

The hollow plastic article thus formed has after appropriate trimming, the general shape, in cross-section, of the article shown in FIGURE 4, exclusive of the lip 23 thereon. Lip 23 is optionally provided by conventional forming means not germane to the present invention and not shown herein.

The cap 14 covers but a portion of the plunger head 13 and has a surface of lesser coefficient of friction than the surface of the plunger head 13 or the overall surface of the plunger 12. The cap 14 thus has a relatively slippery surface which allows that portion of the sheet in contact therewith to more readily slide and stretch around the plunger as it advances into the cavity in an amount comparable with the stretch applied to the remainder of the deformed sheet.

The above slippage of the sheet around the plunger, however, can be made substantially equal or nonexcessive, without the use of the above cap, where a plunger of heat conducting material such as metal is employed, by heating the plunger to within a narrow and critical temperature range. Such range depends on factors, which include, the type of plastic sheet material selected and the coefficient of friction of the plunger surface. For example, where .007 inch medium density polyethylene sheet is to be thermoformed using an aluminum plunger, the above temperature range is about 5° F., the sheet being heated to about 350° F. and the plunger being heated to about 275° F. i.e., between about 272° F. and 277° F.

Where the above uncapped plunger becomes heated above the foregoing critical temperature range, that portion of the sheet in contact with the plunger head tends to cling thereto and stretch and thus thin out, as the plunger advances ino the mold cavity, less than the other portions of the sheet which are in oblique sliding contact with the sides of the plunger. The hollow plastic article thus produced has a relatively thick end wall and excessively thin side walls. Where, however, such plunger is maintained below the above critical temperature range, that portion of the sheet contacted by the plunger head insufficiently adheres thereto and slips excessively around the advancing plunger becoming greatly thinned. The resulting hollow plastic article has excessively thin walls, particularly the end wall thereof. Thus the conventional metal plunger must be maintained within the above critical temperature range to produce a hollow plastic article of substantially uniform wall thickness. However such range as indicated is narrow.

Moreover, the above temperature range is difficult and impractical to maintain particularly in volume production where a thermocouple for each plunger is required. And, as each plunger is used repeatedly, at a rate of, for example, six cycles per minute, in thermoforming plastic articles, a heat buildup in each plunger occurs so that it becomes increasingly difficult to hold the temperature thereof within the above temperature range.

Where the plunger is without the cap of the invention and is of felt or other relatively rigid heat insulating material having a surface of relatively high coefficient of friction, insufficient slippage of that part of the sheet in contact with the plunger head occurs and a drawn plastic article having thinned side walls and a relatively thick end wall results.

Figure 3:
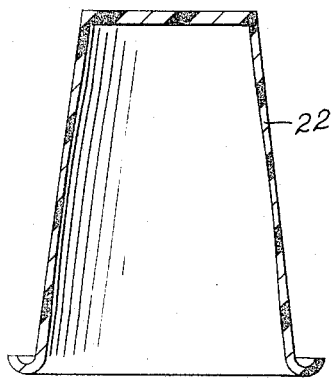

Thus, without the cap of the invention, where the plunger is of metal and is heated above the previously discussed critical temperature range or where the plunger has, for example, a felt surface a similar drawn product results, i.e. an article having a relatively thick end wall and excessively thin side walls, such as the article 22 illustrated in FIGURE 3.

It has been found, however, that the cap should preferably not be so large as to cover the entire head portion since excess slipping and thinning of the head portion of the sheet can occur resulting in a hollow plastic article, as a cup, with an excessively thin end wall and side walls.

The end cap, therefore, preferably covers but a portion of the plunger head, the exposed head surface acting as friction brake to the sheet portion as it slides off the more slippery surface of the cap. By varying the size of the cap surface relative to the plunger head surface, the net slippage of the sheet over the cap and plunger head can be controlled and thus the distribution of the thickness of the walls of the finished article.

Thus the plunger cap of the present invention is a means to readily control the relative wall thickness of the thermoformed article. The skilled craftsman can, for example, select a cap of appropriate size to thermoform a hollow plastic article having walls of equal thickness such as the article 23, shown in FIGURE 4.

In addition, the shape of the cap can take any form convenient to the skilled practitioner such as flat or a dome shape which will affect the slippage of the drawn sheet thereover and thus the respective wall thicknesses of the finished article. For example the dome shaped cap mounted on a plunger will provide a more slippery surface to the sheet being drawn due to the slopes thereof than will a blunt or flat cap.

The cap is of any smooth, heat stable material having a low coefficient of friction or slide resistance. Preferably, the cap or cap surface is of polytetrafluoroethylene material teflon which has a coefficient of friction of about .04 but silicone rubber or other suitable material can be readily selected by the skilled practitioner.

The cap can be employed with virtually any conventional plunger including one of metal or of other materials such as felt. Where a metal-surfaced plunger is employed, the metal is preferably heated above the above discussed critical temperature range so that the exposed head portion can provide a strong surface friction resistance to the drawn sheet passing thereover in cooperation with slippery surface of the cap.

The mold and plunger can be of any conventional materials. Thus the mold can be of metal such as aluminum, stainless steel and the like. The plunger can be of metal as above or of other materials such as felt or felt covered metal.

The shape of that part of the plunger entering the mold cavity, called herein the leading portion of the plunger, can take virtually any conventional shape, which shape will be influenced by the desired form of the finished hollow plastic article. For examples, the above shape can be cylindrical, frusto-conical, a shape having a generally overall curved surface and the like.

One or more of such plungers are mounted in registration with an associated cavity for cooperation therewith. Each cavity is larger than the leading portion of the corresponding plunger and can have a corresponding or different shape than such leading portion as selected by the skilled practitioner.

The sheet is heated, before being drawn, to a suitable deformation temperature which temperature varies with the type of thermoplastic sheet employed. Such temperatures are well known in the art, for example, a suitable deformation of medium density polyethylene sheet is about 350° F.

What is claimed is:

1. In an apparatus for thermoforming hollow plastic articles, said apparatus having a mold with a cavity therein, a plunger mounted in registration with said cavity, which plunger has a leading portion of smaller dimensions than the corresponding walls of said cavity so as to provide an annular space therebetween, said leading portion terminating in a plunger head and being adapted to contact a heated plastic sheet securely positioned between said plunger and the mold cavity and draw said sheet into said cavity for formation of said hollow plastic article, the improvement comprising a cap affixed to said plunger head and covering a portion thereof so as to form part of the sheet contacting surface of said head, said cap having a surface of lesser coefficient of friction than the surface of said head and being of different material than said head and serving to reduce the overall coefficient of friction of said leading portion.

2. The apparatus of claim 1 having a means to establish a fluid pressure differential on opposite sides of the drawn sheet to assist said plunger in drawing said sheet into said cavity.

3. The apparatus of claim 1 wherein said mold has a plurality of said cavities and a corresponding number of said plungers cooperating in registration therewith.

4. The apparatus of claim 1 wherein said leading portion is cylindrical in shape.

5. The apparatus of claim 1 wherein said leading portion is frusto-conical in shape with said head portion defining the smaller end thereof.

6. The apparatus of claim 1 wherein the said cap has a surface of polytetrafluoroethylene.

7. The apparatus of claim 1 wherein the plunger head has a surface of felt material and said cap has a surface of polytetrafluoroethylene.

8. The apparatus of claim 1 wherein said cap is of a heat-stable plastic material having a smooth surface of low slide resistance.

References Cited by the Examiner
UNITED STATES PATENTS

| | | | |
|---|---|---|---|
| 1,935,076 | 11/1933 | Burns | 25—102 XR |
| 2,693,618 | 11/1954 | Pfeiffer. | |
| 2,988,208 | 6/1961 | Loew. | |
| 3,172,159 | 3/1965 | Edward | 18—19 |
| 3,235,639 | 2/1966 | Knowles | 18—12 XR |

WILLIAM J. STEPHENSON, *Primary Examiner.*